Feb. 12, 1963 W. B. ZELINA 3,077,549
PERMANENT MAGNET INDICATOR ALTERNATOR
Filed April 7, 1960 3 Sheets-Sheet 1

INVENTOR.
WILLIAM B. ZELINA
BY Vernon F. Kalb
ATTORNEY

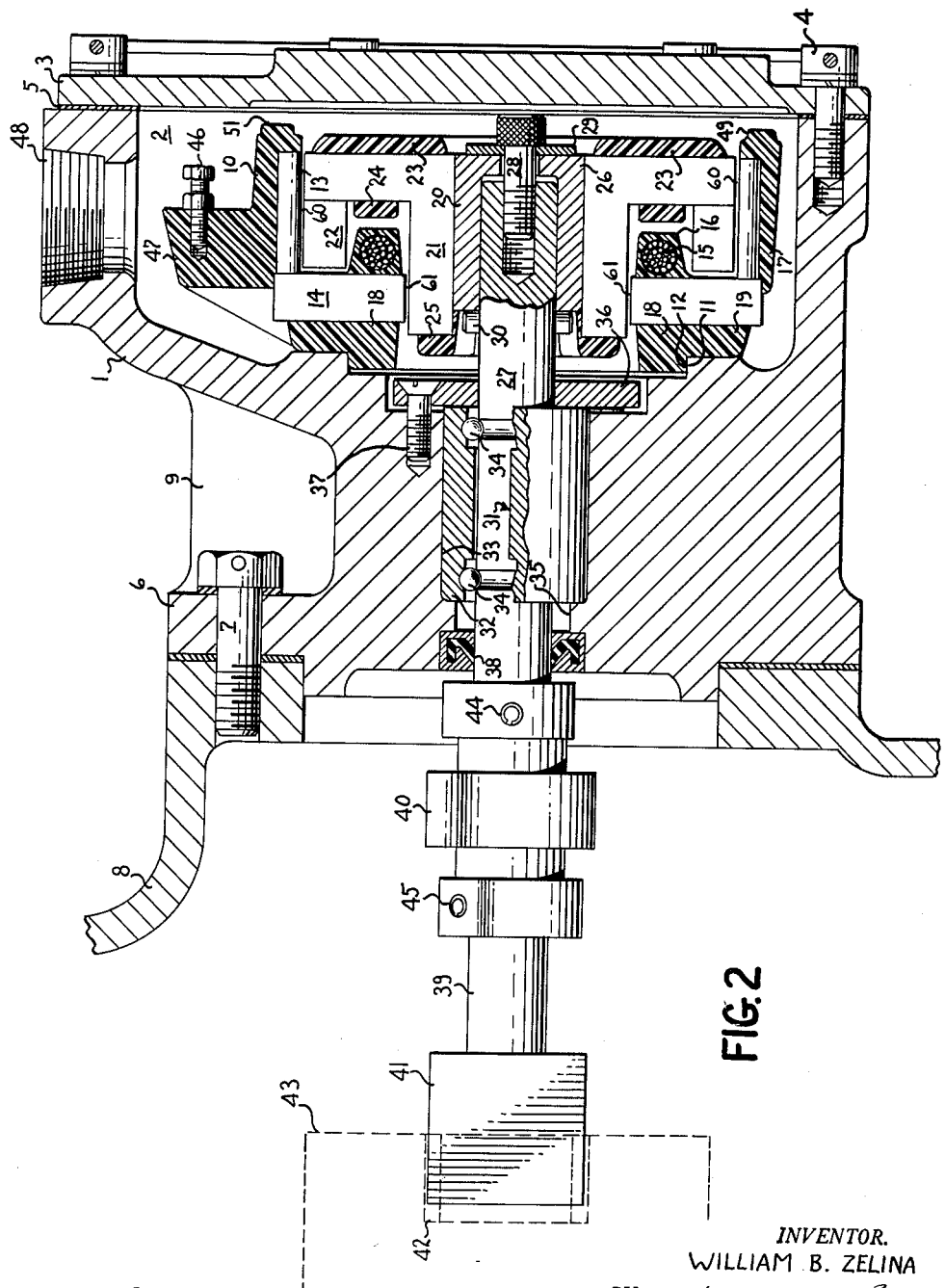

Feb. 12, 1963    W. B. ZELINA    3,077,549
PERMANENT MAGNET INDICATOR ALTERNATOR
Filed April 7, 1960    3 Sheets-Sheet 3
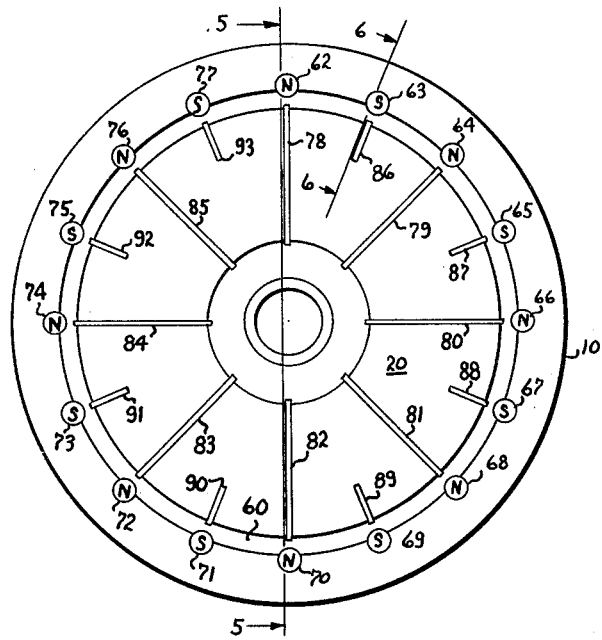
FIG. 4
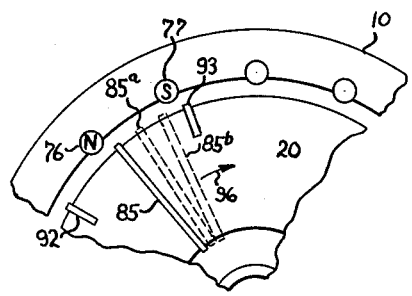
FIG. 7
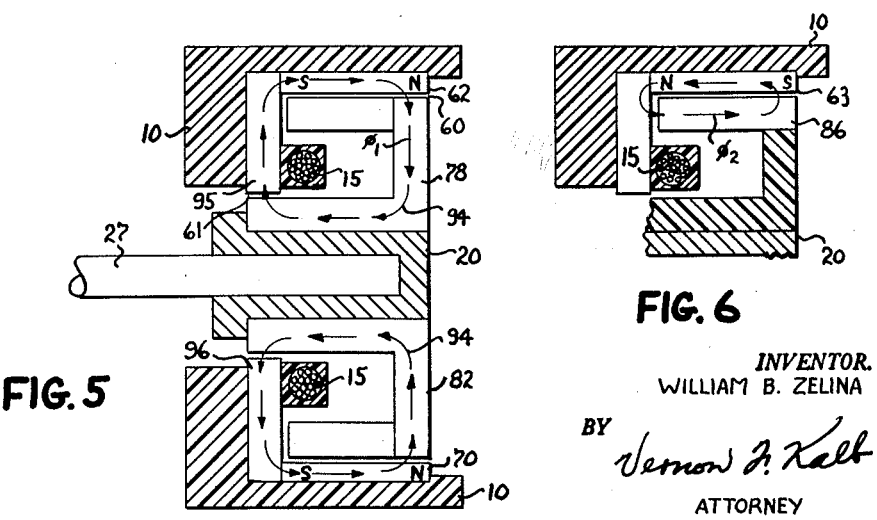
FIG. 6
FIG. 5
INVENTOR.
WILLIAM B. ZELINA
BY Vernon J. Kalb
ATTORNEY

3,077,549
PERMANENT MAGNET INDICATOR ALTERNATOR
William B. Zelina, Erie, Pa., assignor to General Electric Company, a corporation of New York
Filed Apr. 7, 1960, Ser. No. 20,767
15 Claims. (Cl. 310—155)

This invention relates to alternators, and more particularly relates to alternators designed for use as tachometer generators.

In control systems quite often the signal proportional to the angular velocities of a shaft is required. A common practice is to utilize some form of generator or alternator to provide a voltage or frequency proportional to the speed of the rotating shaft. In some cases, a direct current (D.C.) generator may be utilized to provide a unidirectional signal proportional to the driven speed of the generator. However, as is the case with all machines having brushes, there must be periodic maintenance to replace and reseat brushes, and D.C. machines are more susceptible to loss of service due to shock and vibration. Therefore, in many installations an alternator is preferable.

The frequency of the output signal of the alternator will depend upon its driven speed, and the number of flux reversals per cycle of the alternator. The flux reversals are sensed by so positioning coils that the flux reversals induce voltages therein. The R.M.S. voltage of the alternator will of course be proportional to the strength of the magnetic field as well as the rate of change of flux sensed by the coils with respect to time. However, the total volt-seconds of any half cycle of the alternating wave output of the alternator will theoretically remain constant. Therefore, if the alternating wave output of the alternator is rectified and properly filtered to obtain a unidirectional signal related to the average value of the rectified alternating wave, a unidirectional voltage proportional to the frequency of the alternator signal, and hence the driven speed of the alternator, may be derived. Networks for accomplishing such rectification and filtering are well known and may or may not include a frequency sensitive saturating transformer.

All of these conversion networks require a filter network to smooth the rectified output of the alternator to yield a unidirectional signal having a low or substantially no ripple thereon. This type of alternating-to-direct current conversion proves satisfactory as long as the volt-seconds of each half cycle of the alternator output remains constant, and so long as the time constant of the filtering network is properly related to the repetition rate of the rectified half cycle output of the alternator. If the time constant of the filter circuit is too large for this repetition rate, the response of the conversion network to the rectified alternating wave input will be slow. This is very undesirable in regulated control and servo systems where there are means dependent on the immediate speed of the shaft whose angular velocities are being measured. If the time constant of the filter network is made too small with respect to the repetition rate of the rectified alternating wave input, there will be an undesirable ripple in the unidirectional output.

A significant problem is presented where an alternator is used as a tachometer generator over a wide speed range. At low driven speeds of the alternator the repetition rate of the rectified alternating current wave will be low with respect to the time constant of the filter circuit resulting in a slow response of the conversion network. This problem may be alleviated by using an alternator having a larger number of poles to thereby yield a higher frequency output at low speeds. However, when the number of poles are increased without increasing the spacing between the poles, and hence the size of the alternator, the flux reversals of the alternator with the larger number of poles may become so rapid that the residual flux conducted by the flux-conducting members prevents adequate build-up of flux in the reversing direction as the rotor moves between alternately poled poles, and the total useful flux for generating a voltage in a pick-up coil is reduced. The resulting decrease in R.M.S. voltage is reflected in a decrease in the volt-second value of each half cycle of the alternating wave output. Therefore, the conversion network can no longer yield a unidirectional signal proportional to the driven speed of the alternator.

A tachometer generator in a control system may be classified as a non-working element, inasmuch as it does not contribute directly to the purpose of the control system, but must be used for regulation of the control system. Therefore, in the interests of economy, the tachometer generator should be low in cost and compact in size. Furthermore, in many installations such as where a tachometer generator is mounted on the journal box of a rail vehicle truck and connected to an axle to measure the speed of rotation of the axle, it must be very sturdy and rugged, inasmuch as it will be subjected to extremely large shock and vibration forces.

The present invention provides a permanent magnet alternator designed for use as a tachometer generator which may have a relatively high frequency output at low driven speeds and which eliminates or substantially reduces residual flux in the flux-conducting members of the alternator which would tend to decrease the voltage output thereof. The present invention further provides an economical and reliable alternator which is extremely rugged and compact.

It is therefore an object of the present invention to provide an alternator capable of accurately indicating its driven speed over a wide speed range.

It is another object of the present invention to provide a relatively inexpensive alternator which is rugged and compact in design and adapted for use in a variety of installations.

Briefly stated, these and other objects of my invention are achieved in one form thereof by the provision of a cast stator of non-magnetic material having alternately poled permanent magnets imbedded in the casting around the periphery thereof. Also imbedded in the stator is a pick-up coil lying in a plane generally perpendicular to the axis of the alternator and co-axial therewith. The alternator rotor is also cast and has a plurality of magnetic members imbedded therein which serve as flux switches which cooperate with the permanent magnets to provide a flux path about the coil. Increased output and sensitivity are provided by a plurality of flux shunts alternately positioned between the flux switches about the periphery of the rotor. The flux shunts permit rapid reversals of the flux without requiring each succeeding reversal to overcome the residual flux existing in the magnetic circuit at the time the flux reversal takes place. Both the rotor and stator are composed of non-magnetic material having the magnetic elements and pick-up coil positioned and supported as by being molded or otherwise imbedded therein to provide a rugged and compact alternator structure of low cost.

These and other novel features of the invention are set forth with particularly in the appended claims. The invention itself, however, both as to its organization and method of operation, together with further objects and advantages thereof, may best be understood by referring to the following description when taken in connection with the following drawings wherein:

FIGURE 2 is a view taken along section 2—2 of FIGURE 1;

FIGURES 4, 5, 6 and 7 illustrate the magnetic circuits of an alternator constructed in accordance with the present invention.

Figure 1:
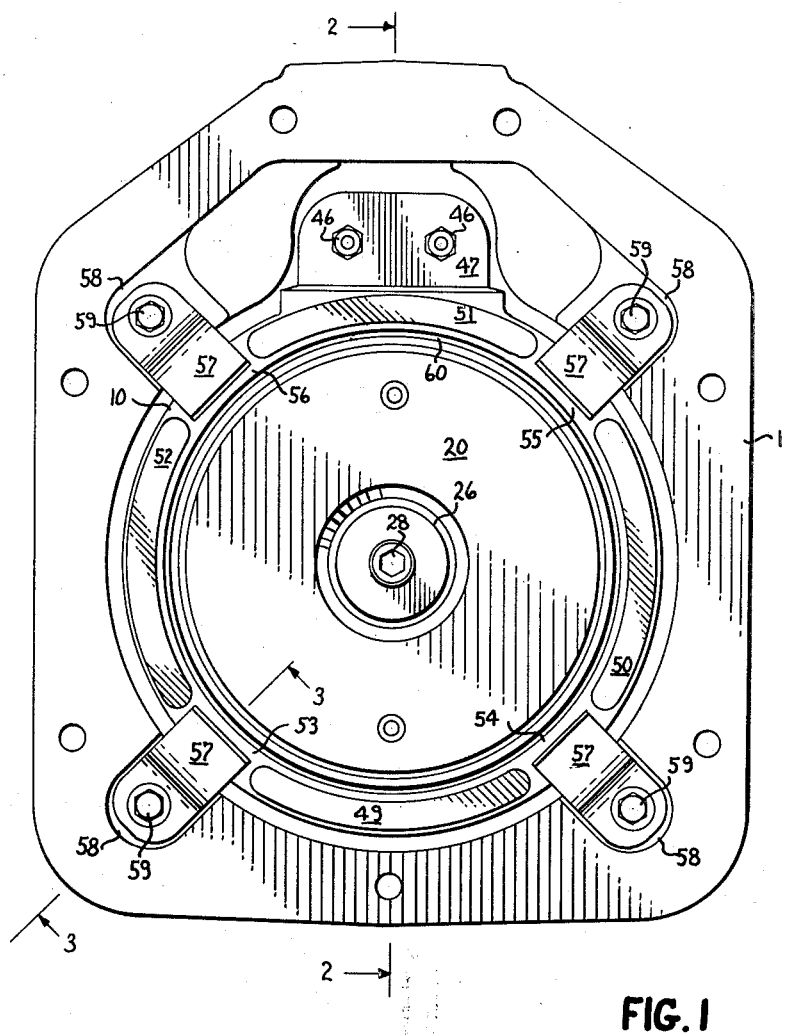
FIGURE 1 is an end view of an alternator embodying my invention with the cover plate removed.

Reference is now made to the drawings wherein like identifying numbers in the several views indicate like elements, and specific reference is made to FIGS. 1 and 2.

The physical structure of an alternator constructed in accordance with the present invention will first be described. The alternator comprises a housing 1 of nonmagnetic material which defines a generally cup-shaped opening 2 in one end thereof. This opening is arranged to be closed by means of a cover plate 3 which is secured to housing 1 as by means of bolts 4. A gasket 5 is provided between the cover plate 3 and housing 1 to seal the cavity 2. The housing 1 has flanges 6 at the end opposite the cover plate which are adapted to receive bolts 7 for connection to a housing member such as a railroad axle journal box 8. Reinforcing ribs 9 may be provided between the main portion of the housing member 1 and flange 6. The housing 1 has an annular shoulder 11 within the cup-shaped portion 2 designed to receive mating annular shoulder portion 12 of the stator 10, and have a rabbeted fit therewith. In the preferred embodiment of my invention the stator 10 comprises permanent bar magnets 13 imbedded in the inner periphery of the stator 10 which is preferably an epoxy resin. Magnetic flux conductors 14 associated with each permanent magnet 13 are also imbedded in the stator 10 generally perpendicular to the permanent magnets. An annular pre-formed multi-turn coil 15 is imbedded in portion 16 of the stator casting.

In constructing the stator 10, I prefer to arrange glass cloth, not shown, in stator portions 17, 18 and 19 to add strength to the structure. Further means for retaining and properly aligning the stator within the housing 1 are discussed and illustrated in conjunction with the discussion of FIG. 3. The rotor 20 is preferably also a thermosetting epoxy resin structure having generally L-shaped flux switches 21 and flux shunts 22 molded therein. As may be seen, the flux switches 21, permanent magnets 13 and flux conductors 14 form a magnetic circuit about coil 15. Glass cloth, not shown, is preferably imbedded in rotor portions 23, 24 and 25 to add strength to the rotor structure. A hub member 26 is imbedded in the rotor structure. The rotor is mounted on shaft 27 and aligned thereby with respect to the stator 10. The rotor shaft 27 is fitted into rotor hub member 26 and secured thereto by means of a bolt 28. A spring washer 29 is positioned between the head of the bolt 28 and the hub 26. A roll pin 30 is passed through a hole in shaft 27 to secure and properly locate the rotor on shaft 27. Shaft 27 is mounted in and aligned with respect to housing 1 by means of bearing assembly 31 which comprises an outer race 32 inserted into cylindrical opening 33 of the housing. In this preferred bearing assembly, the shaft 27 itself is the inner race and is grooved to receive ball bearing assemblies 34. The bearing assembly 31 is locked in the housing 1 by means of stopping ledges 35 formed integrally with the housing 1 and bearing retaining plate 36 fastened to the housing 1 as by means of screws 37. An oil seal 38 is provided about the shaft 27 at one end thereof. The rotor shaft 27 is preferably connected to driven shaft 39 through flexible coupling 40 which minimizes axial bearing loading on bearing assembly 31 due to any misalignment between the driving shaft and shaft 27. The driven shaft 39 may have means such as a spade 41 on the end thereof adapted to engage splines 42 in the end of the shaft whose angular velocity is to be measured—in this case a railroad axle 43. It will, of course, be realized that other means than spade 41 may be utilized, depending upon the connection desired and the type of driving shaft. Roll pins 44 and 45 secure the flexible coupling to shafts 27 and 39 respectively.

Conductive terminal studs 46 are imbedded in stator portion 47. The terminals are connected, not shown, to the ends of coil 15, not shown. A conduit access aperture 48 is provided in the upper portion of housing 1 to facilitate the connection of leads thereto. The aperture 48 is threaded to recive a conduit adapter plug to seal the cavity from foreign matter.

Figure 3:
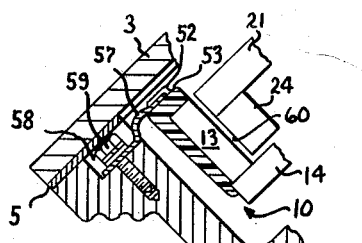
FIGURE 3 is a view taken along section 3—3 of FIGURE 1.

Reference is now made to FIG. 3 wherein I show means for aiding in retaining and aligning the stator within the cavity 2. The stator 10 has elevated portions 49, 50, 51 and 52 thereon which provide seat portions 53, 54, 55 and 56 therebetween. Spring steel clips 57 secured to the housing 1 in recesses 58 by means of bolts 59 bear on stator portions 53, 54, 55 and 56 and exert pressure thereon to hold shoulder portion 12 of stator 10 in mating shoulder portion 11 of housing 1, thus resiliently positioning stator 10 in housing 1.

The illustrated manner in which the stator 10 and rotor 20 are mounted with respect to the housing 1 facilitates accomplishment of the proper dimensions for air gaps 60 and 61.

In FIGS. 4 through 7 I illustrate the operation and cooperation of a rotor and stator of an alternator embodying the present invention. Inasmuch as the actual structure of an alternator embodying my invention has previously been illustrated and described, the rotor and stator in FIGS. 4 through 7 are illustrated diagrammatically, and emphasis is placed on discussion and illustration of the magnetic and electrical circuits of the alternator. In FIGS. 4 through 7 I illustrate a sixteen-pole alternator embodying the present invention. In actual practice, the number of poles are limited only by the air gap spacing between rotor and stator.

Reference is now made specifically to FIG. 4, which shows the stator 10 having sixteen permanent magnets 13, here numbered 62 through 77, equally spaced about the inner periphery of the stator 10. The polarities of the permanent magnets 62 through 77 are such that the ends viewed in FIG. 4 are of alternate polarity, i.e., the illustrated ends of the odd numbered magnets appear as south poles and are marked "S," while the illustrated ends of the even numbered magnets appear as north and are marked "N." The rotor 20 has flux switches 78 through 85 imbedded therein. The flux switches extend radially from the center of the rotor and are preferably positioned equi-angularly about the rotor. Flux shunts 86 through 93 also of suitable magnetic material are imbedded about the periphery of the rotor 20 between each of the flux switches, and in the embodiment shown are located on the bisector of the angle between the flux switches. With the rotor in the position shown in FIG. 4, it will be noted that each of the eight north poles (i.e., even numbered poles) has one of the eight flux switches positioned directly adjacent to it across air gap 60. At the same time, each of the eight south poles (i.e., odd numbered poles) has one of the eight flux shunts positioned directly adjacent thereto across air gap 60.

Reference is now made to FIG. 5 which is a view along section 5—5 of FIG. 4. Flux switches 78 and 82 are shown in the position directly adjacent to permanent magnets 62 and 70. Each of the flux switches is generally L-shaped with a depending leg portion extending parallel to shaft 27 of the rotor 20. The flux path shown by the arrows 94 travels from the north poles of magnets 62 and 70 across air gap 60, through the respective flux switches 78 and 82, across air gap 61, through flux conductors 95 and 96 of permanent magnets 62 and 70, across air gap 60, and hence to the south poles of the permanent magnets 62 and 70 respectively. Similar flux paths exist in the other magnetic circuits formed by magnets 64, 66, 68, 72, 74 and 76 and associated flux switches and flux conductors. Pick-up coil 15 mounted in the stator structure is positioned concentrically with respect to the stator so that the flux travelling through the flux switches and flux conductors encircle the coil.

Reference is now made to FIG. 6 which is a view taken along section 6—6 of FIG. 4, and is 1/16 of a revolution clockwise removed from section 5—5 illustrated in FIG. 5. The permanent magnet 63 in the stator 10 is adjacent to a flux shunt 86 which extends parallel to the axis of the rotor and is also imbedded in the epoxy of the rotor 20. The flux shunt 86 provides a very low reluctance flux path for the flux $\phi_2$ emanating from permanent magnet 63, and therefore shunts the flux emanating from permanent magnet 63, by-passing the flux $\phi_2$ external to coil 15. Flux shunts 87 through 93 provide similar shunts for magnets 65, 67, 69, 71, 73, 75 and 77 respectively. If the rotor were to be rotated 1/16 of a revolution from the position shown in FIG. 4, the flux shunts 86 through 93 would shunt permanent magnets 64, 66, 68, 70, 72, 74, 76 and 62 respectively, and the direction of the flux $\phi_1$ through the flux switches 78 through 85 would be reversed, thereby inducing a voltage in coil 15 upon reversal.

The operation of the device is now described in connection with FIGS. 4, 5 and 6. With the rotor 20 in the position shown in these figures, flux $\phi_1$ is conducted in paths defined by the flux switches 78 through 85 from the north pole of the permanent magnets 62, 64, 66, 68, 70, 72, 74 and 76 across air gap 60, switches 78 through 85 respectively, across air gap 61 and through the flux conductors associated with the aforesaid magnets and back to the south pole of the respective magnets. As the flux switches on the rotor move from beneath one permanent magnet to an adjacent oppositely poled permanent magnet, the reversal of flux about the coil 15 induces a voltage therein. In the transition from the permanent magnets of one polarity to the adjacent magnets of the opposite polarity, the flux is reversed, resulting in the induction of an alternating current in the coil 15. Inasmuch as the flux emanating from each magnet is constant, the magnitude of the voltage induced in coil 15 is dependent on the rate of reversal of flux, and hence the speed of the rotor and the number of turns of the coil, and is given by the expression $$V = N\frac{d\phi}{dt}$$

When the flux switches 78 through 85 are aligned with all of the permanent magnets of a given polarity, the flux shunts 86 through 93 are aligned with all of the permanent magnets of the opposite polarity. The flux emanating from the permanent magnets aligned with the flux shunts is thus prevented from counteracting the flux conducted in the flux switches and associated flux conductors by the shunting action of the flux shunts, as shown in FIG. 6. Therefore, as the rotor is driven, the flux through the flux switches and flux conductors causes a voltage to be induced in the pick-up coil 15. However, the leakage flux in the flux switches and the flux conductors which would normally tend to counteract or oppose the flux of opposite polarity emanating from the succeeding or preceding permanent magnet, is effectively short-circuited by the flux shunts. Therefore, the effect on the pick-up coil of those magnets is substantially eliminated.

The manner in which this increases the average voltage output of the alternator may best be understood by reference to FIG. 7. The flux switch 85 is shown as it would appear a moment after having passed permanent magnet 76 in the direction of rotation indicated by arrow 96. In this position, the flux through flux switch 85 emanating from permanet magnet 76 would be reduced from that occurring when the flux switch 85 is directly aligned with the magnet 76; however, considerable flux from magnet 76 is nevertheless being conducted by the switch 85. The flux switch 85 is indicated, at an instant of time after passing magnet 76, by the numeral 85a. In this position, it may be seen that the switch 85 will be under the influence of the flux exerted by both permanent magnets 76 and 77. At this instant, the flux in the switch 85 is undergoing transition from one polarity to the opposite polarity. Theoretically, as the switch 85 passes the position shown as 85a, this flux immediately reverses. However, under practical conditions, the leakage flux in the switch 85 requires that the flux of opposite polarity caused by the succeeding permanent magnet (magnet 77 in this case) overcome this leakage flux before flux reversal occurs. Therefore, under practical conditions, the flux switch is actually in a position such as shown at 85b before the flux is effectively reversed; thus, the total reversal of the flux is delayed and the flux effective to induce a voltage in coil 15 is also reduced, resulting in a lower voltage output of the alternator. The flux shunts 92 and 93 on either side of permanent magnet 76 provide a low reluctance path for the flux emanating from the permanet magnets 76 and 77. As the flux switch 85 moves from its position adjacent to the permanent magnet 76 toward permanent magnet 77, flux shunt 92 approaches permanet magnet 76. Part of the flux emanating from permanent magnet 76 is conducted away from flux switch 85 by the flux shunt 92 thereby reducing the effect of permanet magnet 76 on the flux reversal. Further, flux shunt 93 passing magnet 77 continues to conduct some of the flux from the permanent magnet 77 as the flux switch 85 passes the midway position between permanent magnets 76 and 77. It will therefore be seen that the flux shunts 86 through 93 (shown in FIG. 4), alternately placed with the flux switches 78 through 85 about the rotor, provide a flux shunting path for alternate permanent magnets. During the periods of transition from flux flow in one direction to the opposite direction in the flux switches, the flux shunts provide a relatively low reluctance path for that flux which would normally decrease the total effective flux in the flux switches. As a result of the utilization of the flux shunts and flux switches interrelated in accordance with the structure of the invention, the voltage induced in coil 15 is substantially increased.

I have illustrated and described an alternator constructed in accordance with my invention having sixteen poles. This number of poles was selected for ease of description and illustration. In actual practice I prefer to construct an alternator having forty poles for service requiring a signal frequency proportional to speed between 0 and 1,000 revolutions per minute. In this alternator, the signal frequency is 20 cycles per revolution. Actually, this frequency constant may be made almost any value depending upon the design. The only real limitation is that the relation of the spacing between the magnets must be large with respect to the sum of the dimensions of the air gaps 60 and 61, for apparent reasons. In alternators constructed for the above-mentioned service, the coil 15 had a mean diameter of 2 1/8 inches, the permanent magnets were 1 inch long by 3/16 inch in diameter Alnico 5. The molding material used to cast the rotor and stator are sold under the nomenclature Hysol 6020–845 at the present time by Hysol, Inc. These specifications are given by way of illustration only, and other suitable or equivalent materials are available.

In manufacturing the rotor and stator of an alternator embodying this invention, the stator is constructed by simply placing the coil, flux conductors and permanent magnets in a suitably formed mold which is then filled with an epoxy resin or other suitable non-magnetic material. To add impact strength, glass cloth is also placed in the mold before the resin. The rotor is similarly made by first placing the hub, flux switches and flux shunts in a suitable mold, locating glass cloth in the mold at desired locations and filling the mold with resin.

The resilient mounting of the stator cushions against shock and impact. An alternator constructed in accordance with the present invention is compact and extremely rugged. A stator for the 40-pole machine previously mentioned measures only 4 1/4 inches in diameter excluding the terminal stud portion and weighs only 18 ounces. The rotor therefore weighs only 12 ounces. An alternator similar to that illustrated in FIGS. 1-3 was subjected to an impact test which consisted of striking with a hammer a plate upon which the alternator driven by a motor was mounted. The shock amounted to 265 g decaying in 30 milliseconds. The total hammer blows were 6,115,600 delivered at a rate of about 10 per minute. The only break in the continuity of the impact test was due to down time of the test equipment. The alternator was continuously driven at 1,020 r.p.m. and had a voltage output of 25 volts at both the beginning and end of the test.

If desired, the power output of an alternator constructed in accordance with the present invention could be increased by laminating the members forming the magnetic circuit.

Although I have specifically described the alternator as mounted in a housing adapted to be secured to a railroad journal box, it should be readily understood that it can be adapted to be mounted in many ways. For example, it could be mounted in the end plate of a variable speed drive machine, such as an eddy current coupling or direct current motor, to indicate the speed of the output shaft. If the stator is mounted in an end plate of such a machine, the rotor of course would be secured to the output shaft in operative relation to the stator.

It will further be noted that an alternator constructed in accordance with the construction aspect of this invention has a rotating shaft requiring support in a bearing assembly at only one end. The rotor may therefore be described as overhanging the bearing.

While I have illustrated and described preferred embodiments of this invention, and modifications thereof, further changes in the disclosed embodiments and modifications which do not depart from the spirit and scope of this invention may occur to those skilled in the art. Accordingly, it is my intention to cover all changes and modifications of the examples of the invention herein chosen for purposes of disclosure which do not constitute departures from the spirit and scope of the invention.

What I claim as new and desire to secure by Letters Patent of the United States is:

1. An alternator comprising, a stator having permanent magnets spaced about the periphery of said stator, a pick-up coil positioned to sense changes of flux emanating from said permanent magnets, and a rotor having flux switches arranged to conduct flux from one pole of each of said permanent magnets to the opposite pole of each of said permanent magnets each of said flux switches being magnetically isolated from the other flux switches whereby each magnetic circuit formed by a permanent magnet and a flux switch is independent of other permanent magnets.

2. An alternator comprising, a stator having permanent magnets spaced about the periphery of said stator, a pick-up coil mounted on said stator and positioned to sense changes of flux emanating from said permanent magnets, and a rotor having flux switches arranged to conduct flux from one pole of each of said permanent magnets to the opposite pole of each of said permanent magnets each of said flux switches being magnetically isolated from the other flux switches whereby each magnetic circuit formed by a permanent magnet and a flux switch is independent of other permanent magnets.

3. An alternator comprising, a stator having permanent magnets spaced about the periphery of said stator, a circular pick-up coil concentrically mounted on said stator and positioned to sense changes of flux emanating from said permanent magnets, a rotor having flux switches arranged to conduct flux from one pole of each of said permanent magnets through said pick-up coil generally at right angles to the plane of said coil to the opposite pole of each of said permanent magnets each of said flux switches being magnetically isolated from the other flux switches whereby each magnetic circuit formed by a permanent magnet and a flux switch is independent of other permanent magnets.

4. An alternator comprising, a stator having alternately poled equally spaced permanent magnets positioned around the periphery of said stator, a circular pick-up coil concentrically mounted on said stator and positioned to sense changes of flux emanating from said permanent magnets, and a rotor having flux switches arranged to conduct flux from one pole of each of said permanent magnets through said pick-up coil generally at right angles to the plane of said coil to the opposite pole of each of said permanent magnets each of said flux switches being magnetically isolated from the other flux switches whereby each magnetic circuit formed by a permanent magnet and a flux switch is independent of other permanent magnets.

5. An alternator comprising, a stator having alternately poled permanent magnets positioned about the periphery of said stator, a pick-up coil mounted on said stator and positioned to sense changes of flux emanating from said permanent magnets, a rotor having flux switches arranged to conduct flux from a pole of each of said permanent magnets of one polarity to the opposite pole of each of said permanent magnets of one polarity, and flux shunts mounted on said rotor between said flux switches and arranged to conduct flux from one pole of the alternate permanent magnets to the opposite pole of each of said alternate permanent magnets.

6. An alternator comprising, a stator having alternately poled equally spaced permanent magnets positioned about the periphery of said stator, a circular pick-up coil concentrically mounted on said stator and positioned to sense changes of flux emanating from said permanent magnets, a rotor having flux switches arranged to conduct flux from one pole of each of said permanent magnets of one polarity through said pick-up coil generally at right angles to the plane of said coil to the opposite pole of each of said permanent magnets of one polarity, and flux shunts mounted on said rotor between said flux switches and arranged to conduct flux from one pole of each of the alternate permanent magnets to the opposite pole of each of said alternate permanent magnets.

7. An alternator comprising, a stator having alternately poled equally spaced permanent magnets positioned about the periphery of said stator, a circular pick-up coil concentrically mounted on said stator and positioned to sense changes of flux emanating from said permanent magnets, a rotor having flux switches arranged to conduct flux from one pole of each of said permanent magnets through said pick-up coil generally at right angles to the plane of said coil to the opposite pole of each of said permanent magnets, said flux switches comprising L-shaped material of low reluctance having one leg thereof parallel to the axis of said rotor and the other leg extending radially from the axis of said rotor.

8. An alternator comprising, a stator having alternately poled equally spaced permanent magnets spaced about the periphery of said stator and positioned parallel to the axis of said stator, a circular pick-up coil concentrically mounted on said stator and positioned to sense changes of flux emanating from said permanent magnets, a rotor having flux switches arranged to conduct flux from one side of each of said permanent magnets of one polarity through said pick-up coil generally at right angles to the plane of said coil to the opposite pole of each of said permanent magnets of one polarity, said flux switches comprising L-shaped material of low reluctance having one leg thereof parallel to the axis of said rotor and the other leg extending radially from the axis of said rotor, flux shunts mounted on said rotor between said flux switches and arranged to conduct flux from one pole of each of the alternate permanent magnets to the opposite pole of each of said alternate permanent magnets, said flux shunts comprising strips of low reluctance material positioned parallel to the axis of said rotor.

9. An alternator comprising, a stator having permanent magnets spaced about the periphery of said stator, a pick-up coil mounted on said stator and positioned to sense changes of flux emanating from said permanent magnets, and a rotor having flux switches arranged to conduct flux from one pole of each of said permanent magnets to the opposite pole of each of said permanent magnets, said magnets and said coil being cast in a non-magnetic material to form the stator structure and magnetically isolate each of said permanent magnets from the other, said rotor comprising a body of non-magnetic material having said flux switches carried therein, said rotor material magnetically isolating each of said flux switches from the others whereby each magnetic circuit formed by a permanent magnet and a flux switch is independent of other permanent magnets and flux switches.

10. An alternator comprising, a stator having permanent magnets spaced about the periphery of said stator, a pick-up coil mounted on said stator and positioned to sense changes of flux emanating from said permanent magnets, and a rotor having flux switches arranged to conduct flux from one pole of each of said permanent magnets to the opposite pole of each of said permanent magnets, said rotor comprising a non-magnetic material having said flux switches imbedded therein, said rotor material magnetically isolating each of said flux switches from the other flux switches whereby each magnetic circuit formed by a permanent magnet and a flux switch is independent of other permanent magnets and flux switches.

11. A dynamoelectric machine comprising a housing member defining a cavity in one end thereof, a shaft rotatably supported in bearing means in a second end of said housing member and unsupportably extending into said cavity, a rotor member mounted on the extending portion of said shaft, a stator member having first and second end surfaces, means aligning one of said surfaces of said stator with said housing to coaxially align said stator member over said rotor surface and form an annular gap therebetween, and resilient means supported by said housing member bearing on the other of said end surfaces of said stator to resiliently support said stator on said housing.

12. The dynamoelectric machine of claim 11 wherein said one surface of said stator and said housing have a rabbet fit therebetween.

13. An alternator comprising a stationary member and a rotating member, one of said members having an annular inner periphery and the other of said members having an annular outer periphery, said peripheries being coaxial and defining a gap therebetween, one of said members having $n$ alternately oppositely poled permanent magnets equally spaced about its annular surface, the other of said members having $$\frac{n}{2}$$

magnetically independent flux switches equally spaced about its annular periphery, one of said members being stationary and the other of said members arranged to be rotated about an axis coaxial to both members, and a coil on the stationary member positioned to sense changes in flux emanating from said permanent magnets, whereby the flux sensed by said coil reverses upon each $$\frac{1}{n}$$

of a rotation of said rotating member.

14. The alternator of claim 13 wherein flux shunts are positioned intermediate the flux switches on the other of said members to conduct flux from one pole of alternate permanent magnets to the opposite pole of each of said alternate permanent magnets.

15. The alternator of claim 13 wherein said members comprise non-magnetic material which support said permanent magnets and said flux switches on the respective members and magnetically isolate said permanent magnets from each other and said flux switches from each other on the respective members.

References Cited in the file of this patent
UNITED STATES PATENTS

| | | |
|---|---|---|
| 1,442,512 | Andreino | Jan. 16, 1923 |
| 1,684,343 | Cardellino | Sept. 11, 1928 |
| 1,961,782 | Rich | June 5, 1934 |
| 2,419,301 | Tragessor | Apr. 22, 1947 |
| 2,508,524 | Lang | May 23, 1950 |